(12) United States Patent
Obata et al.

(10) Patent No.: US 7,384,302 B2
(45) Date of Patent: Jun. 10, 2008

(54) CHARGING COMMUNICATION-ADAPTOR FOR MOBILE DEVICE

(75) Inventors: Takao Obata, Tokyo (JP); Yuji Shimoda, Tokyo (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 579 days.

(21) Appl. No.: 10/776,236

(22) Filed: Feb. 12, 2004

(65) Prior Publication Data

US 2005/0096100 A1 May 5, 2005

(30) Foreign Application Priority Data

Oct. 31, 2003 (JP) .............................. 2003-372405

(51) Int. Cl.
*H01R 13/627* (2006.01)
(52) U.S. Cl. ..................................... 439/532
(58) Field of Classification Search ................ 439/537, 439/929
See application file for complete search history.

(56) References Cited

U.S. PATENT DOCUMENTS

| | | | | |
|---|---|---|---|---|
| 4,903,325 A | * | 2/1990 | Yoshitake et al. | 455/575.9 |
| 5,030,902 A | * | 7/1991 | Mattinger et al. | 439/929 |
| 5,052,943 A | * | 10/1991 | Davis | 439/357 |
| 5,256,955 A | * | 10/1993 | Tomura et al. | 320/110 |
| 6,359,053 B1 | * | 3/2002 | Chen | 524/495 |
| 7,001,209 B2 | * | 2/2006 | Ebine | 439/500 |

FOREIGN PATENT DOCUMENTS

JP 9-294108 A 11/1997

* cited by examiner

*Primary Examiner*—Briggitte R Hammond
(74) *Attorney, Agent, or Firm*—Staas & Halsey LLP

(57) ABSTRACT

A charging communication-adaptor has such an arrangement that, when a mobile device is attached, communication terminals of the mobile device and the charging communication-adaptor make a contact first, and then the charging terminals of the mobile device and the charging communication-adaptor make a contact.

8 Claims, 8 Drawing Sheets

US 7,384,302 B2

CHARGING COMMUNICATION-ADAPTOR FOR MOBILE DEVICE

BACKGROUND OF THE INVENTION

1) Field of the Invention

The present invention relates to a charging communication-adaptor for a mobile device having functions for charging the mobile device and establishing communication between the mobile device and an external device.

2) Description of the Related Art

Various types of adaptors for the mobile devices are known. Some of the adaptors, charging adaptors, have a function to only recharge the battery of the mobile devices. Other adaptors, communication adaptors, have a function to only establish communication between the mobile device and an external device. Still other adaptors, charging communication-adaptors, have functions of both, to recharge the battery of the mobile devices and to establish the communication between the mobile device and the external device. The external device may be a personal computer (PC) or a server.

The charging communication-adaptors broadly have two types: direct-contact adaptors and wireless adaptors. Japanese Patent Application Laid Open No. H09-294108 discloses a wireless charging communication-adaptor that performs communication with the mobile device using infrared light. The charging communication-adaptor is connected to an external device via a cable.

The direct-contact charging communication-adaptor has communication terminals, corresponding to communication terminals of the mobile-device, and charging terminals, corresponding to charging terminals of the mobile device. When the mobile device is attached to the charging communication-adaptor, the charging terminals of the mobile device make an electrical contact with the charging terminals of the charging communication-adaptor and the communication terminals of the mobile device make an electrical contact with the communication terminals of the charging communication-adaptor. As shown in FIG. 14, the charging communication-adaptor is connected to an external device via communications means, such as USB or RS-232C cable, to establish a communication between the mobile device and the external device.

In the direct-contact charging communication-adaptor, if the mobile device is placed on the charging communication-adaptor in such a manner that the communication terminals of the mobile device make an electrical contact with the communication terminals of the charging communication-adaptor before the charging terminals of the mobile device make an electrical contact with the charging terminals of the charging communication-adaptor, an unstable voltage is applied from the external device to the charging communication-adaptor or the mobile device and there occurs a communication error.

SUMMARY OF THE INVENTION

It is an object of the present invention to solve at least the problems in the conventional technology.

A charging communication-adaptor for a mobile device according to an aspect of the present invention includes a first arrangement and a second arrangement. The first arrangement includes a first component, first charging terminals, and a protrusion. The first component is pressed down and rotates at a certain angle when the mobile device is attached to the charging communication-adaptor, the first charging terminals protrude to make a contact with second charging terminals of the mobile device when the first component is pressed down and rotates, and the protrusion moves in a certain direction when the first component is pressed down and rotates. The second arrangement includes a second component and first communication terminals. The second component is arranged at a certain distance, in the certain direction, from the protrusion. The second component makes a contact with the protrusion and the first charging terminals make a contact with the second charging terminals before the protrusion moves in the certain direction and starts to press down the second component, and the first communication terminals protrude to make a contact with second communication terminals of the mobile device when the protrusion presses down the second component and the second arrangement rotates at a certain angle.

A charging communication-adaptor for a mobile device according to another aspect of the present invention includes first charging terminals and first communication terminals. The first charging terminals are longer than the first communication terminals. When the mobile device is attached to the charging communication-adaptor, the first communication terminals make a contact with second communication terminals of the mobile device after the first charging terminals make a contact with second charging terminals of the mobile device.

The other objects, features, and advantages of the present invention are specifically set forth in or will become apparent from the following detailed descriptions of the invention when read in conjunction with the accompanying drawings.

DETAILED DESCRIPTION

Exemplary embodiments of a charging communication-adaptor according to the present invention will be explained below while referring to the accompanying drawings.

Figure 1:
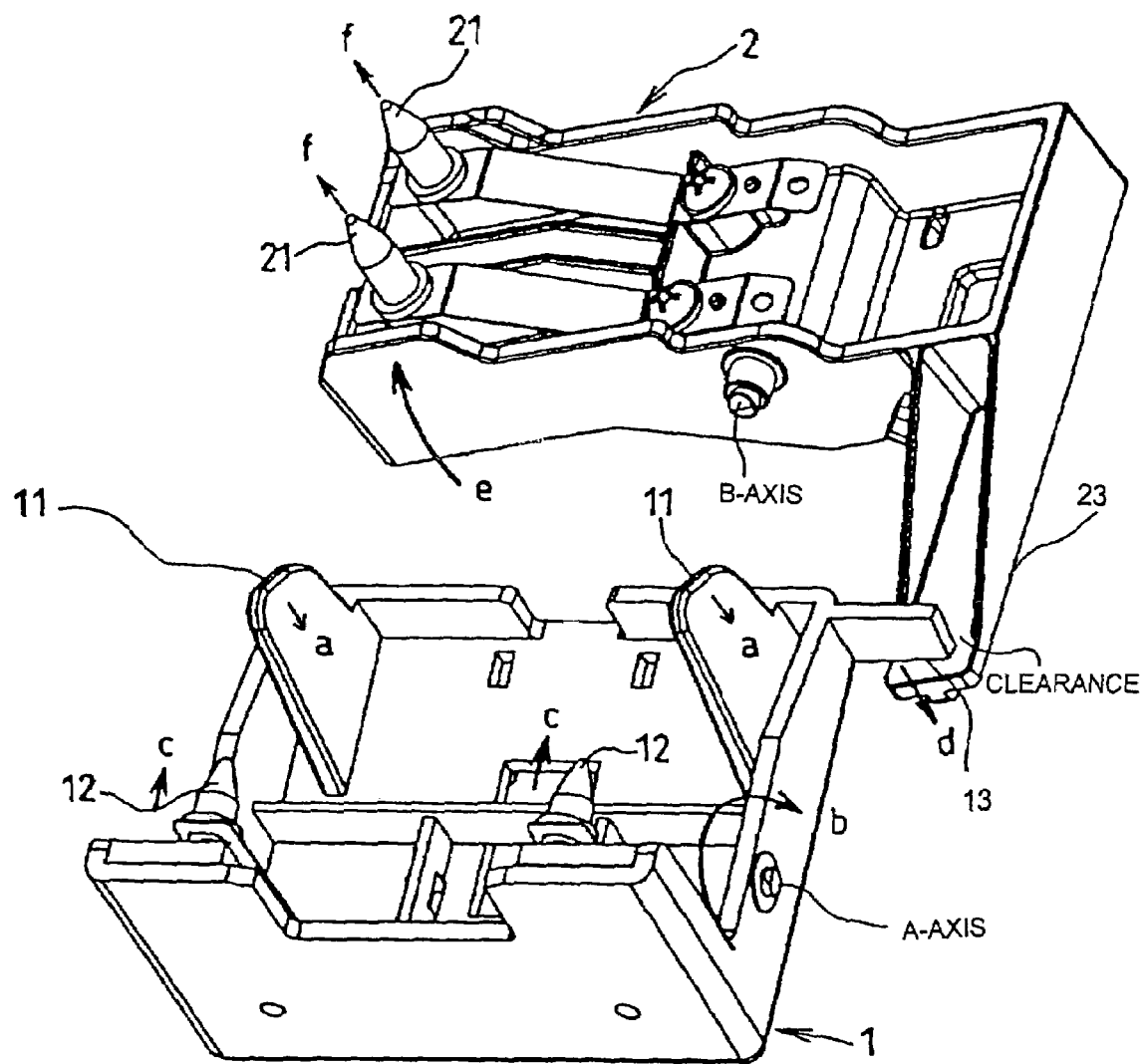
FIG. 1 is a perspective of an interior of a charging communication-adaptor according to an embodiment of the present invention.
Figure 2:
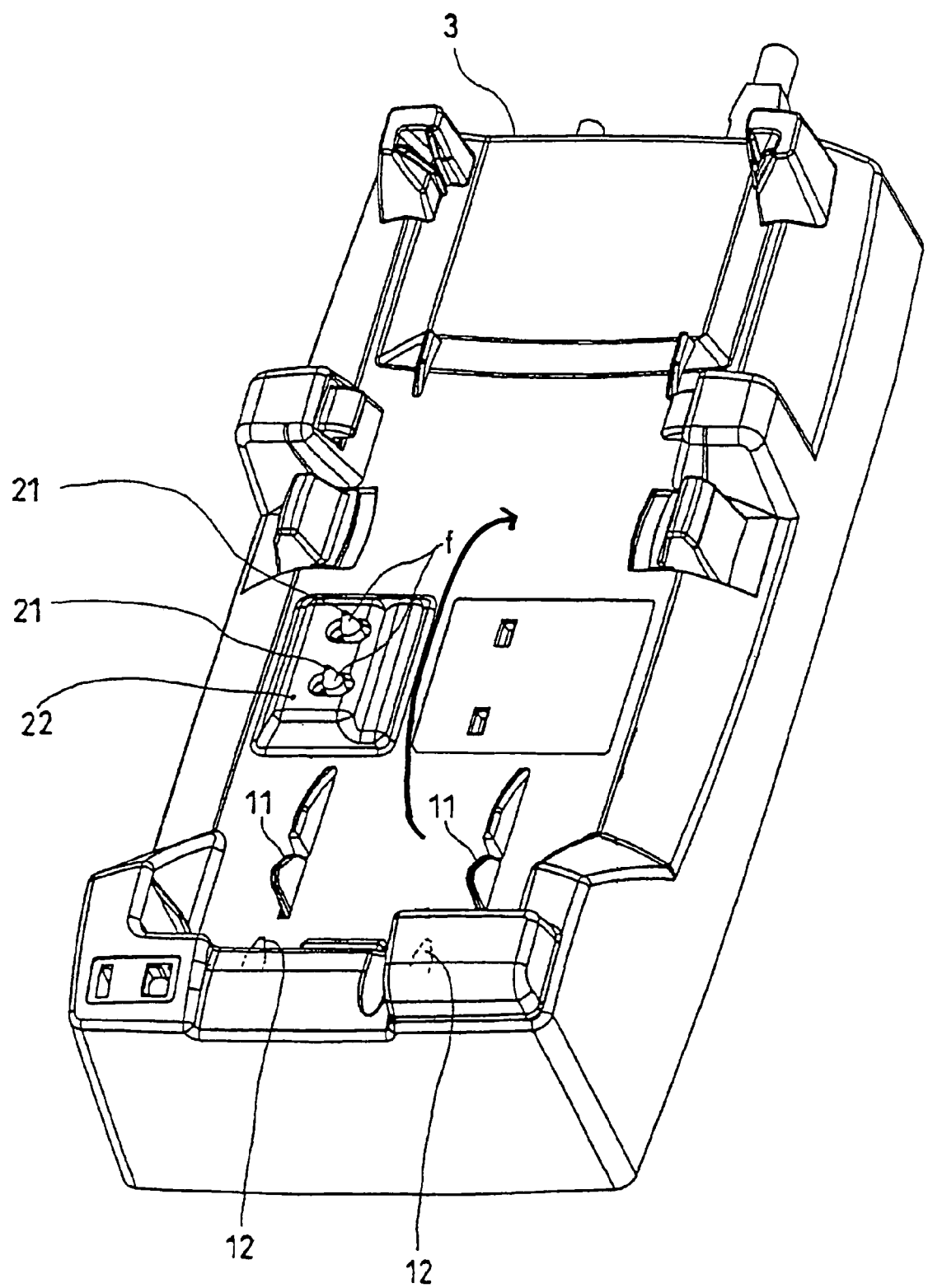
FIG. 2 is a perspective of an exterior of the charging communication-adaptor.

FIG. 1 is a perspective of an interior of a charging communication-adaptor 3 and FIG. 2 is a perspective of an exterior of the charging communication-adaptor. The charging communication-adaptor 3 includes a holder 1 for housing charging terminals and a holder 2 for housing communication terminals.

The holder 1 includes a C part 11, two first charging terminals 12, an A-axis, and a D part 13. The C part 11 may be called a press down part, the A-axis may be called a fulcrum shaft, and the D part 13 may be called a protrusion in the following explanation. Each component works in the following steps to charge a mobile device 4 (not shown), and a step causes the next step. First, the mobile device 4 is attached to the charging communication-adaptor 3. Second, the mobile device 4 presses down on the C part 11 in the direction of arrows a. Third, the A-axis rotates to the direction of an arrow b, the D part 13 moves to the direction of an arrow d for a certain distance (clearance) to make an electronic contact with an E part 23 of the holder 2, and the first charging terminals 12 move in the direction of an arrow c. Fourth, the first charging terminals 12 make a contact with second charging terminals (not shown) of the mobile device 4. Consequently, charging of the mobile device 4 starts.

The holder 2 includes the E part 23, a B-axis, and first communication terminals 21. The E part 23 may be called an arm and the B-axis may be called a fulcrum shaft in the following explanation. Each component works in the following steps, and a step causes the next step. First, the D part 13 pushes the E part 23 to the direction of the arrow d. Second, the B-axis rotates to the direction of an arrow e. The A-axis and the B-axis may be parallel or perpendicular to each other. Simultaneously, the first communication terminals 21 protrude to the direction of an arrow f. Third, the first communication terminals 21 make a contact with second communication terminals (not shown) of the mobile device 4. Consequently, the mobile device 4 starts the communication. The first communication terminals 21 may be USB terminals and the like.

FIG. 2 is a perspective of the charging communication-adaptor 3. When the mobile device 4 is attached to the charging communication-adaptor 3, the mobile device 4 presses down the C part 11. After the first charging terminals 12 protrude and make a contact with the second charging terminals to start charging, the first communication terminals 21 protrude and make a contact with the second communication terminals to establish the communication.

Figure 3:
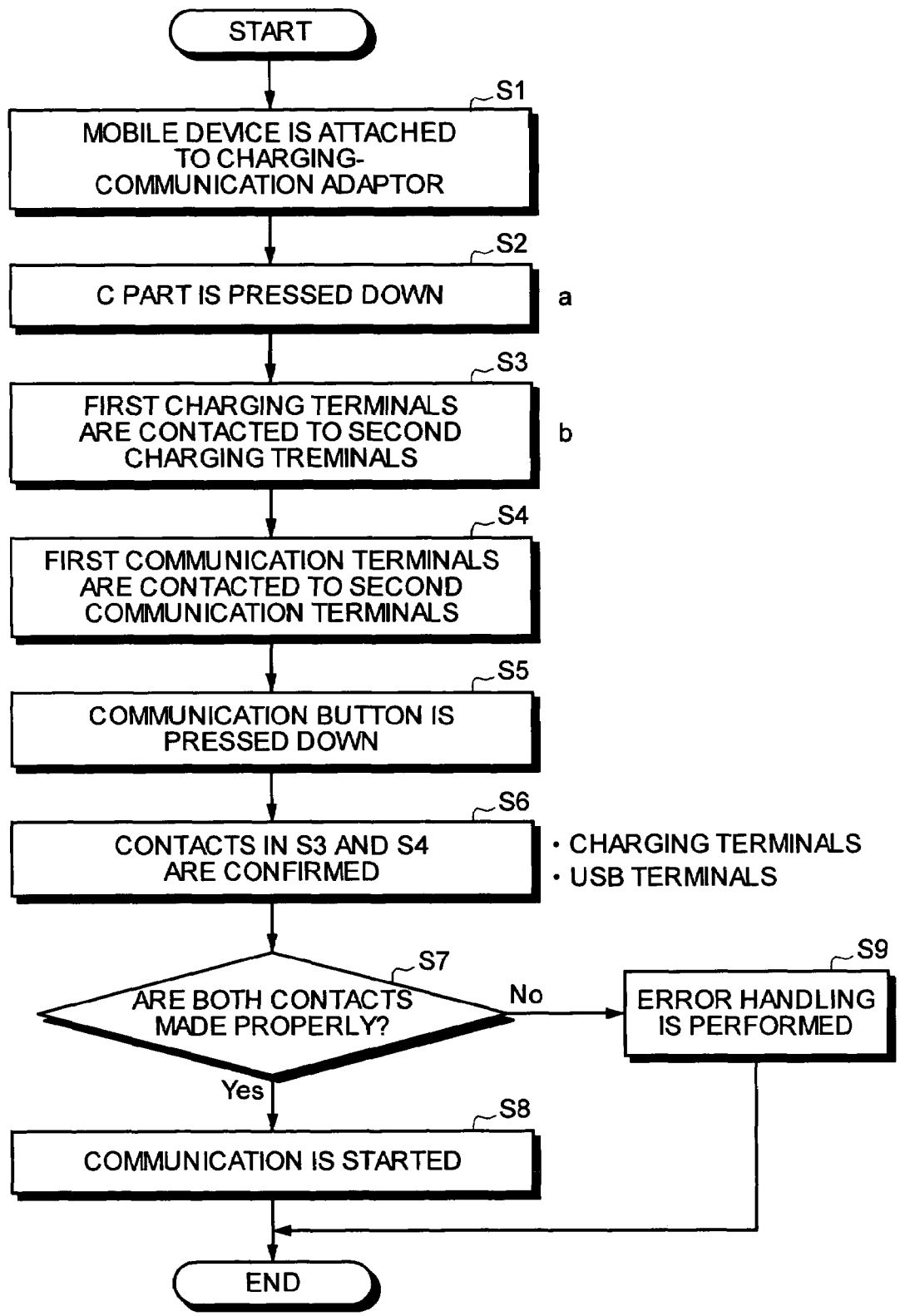
FIG. 3 is a flowchart of operations for charging the charging communication-adaptor and also establishing communication with an external device.

FIG. 3 is a flowchart of operations for charging the charging communication-adaptor 3 and also establishing communication with an external device. The flowchart includes the steps S1 to S9. When the mobile device 4 is attached to the charging communication-adaptor 3 (step S1), the C part 11 is pressed down (step S2), the first charging terminals 12 are contacted to the second charging terminals (step S3), the first communication terminals 21 are contacted to the second communication terminals (step S4). When a communication button is pressed down (step S5), the contacts made in step S3 and step S4 are confirmed (step S6). It is determined whether both the contacts are made properly (step S7). If it is determined at step S7 that both the contacts are made properly, the communication between the mobile device 4 and the external device is started via the charging communication-adaptor 3. If it is determined at step S7 that any one of the contacts is not made properly, an error handling is performed. The error handling may include making a lamp (not shown) blink or glow.

Figure 4:
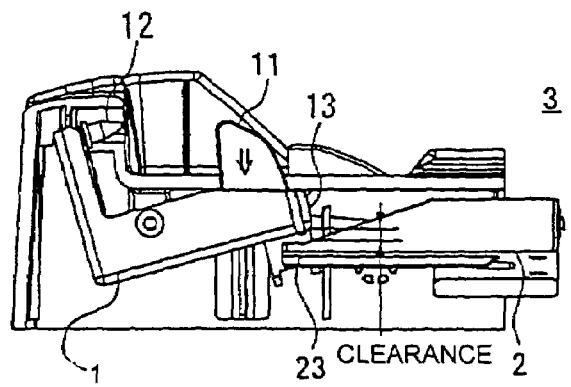
FIG. 4 is a section from a side of the charging communication-adaptor.
Figure 5:
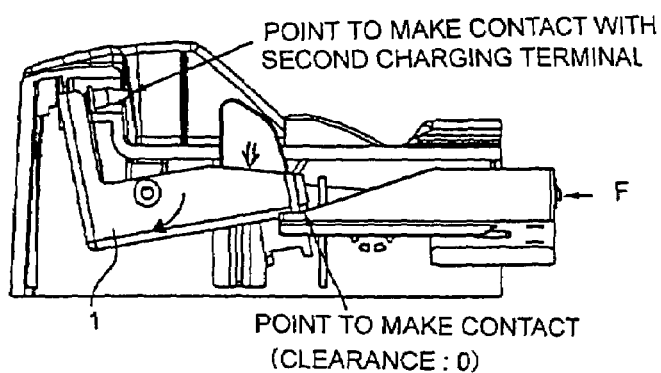
FIG. 5 is a section from a side of the charging communication-adaptor.
Figure 6:
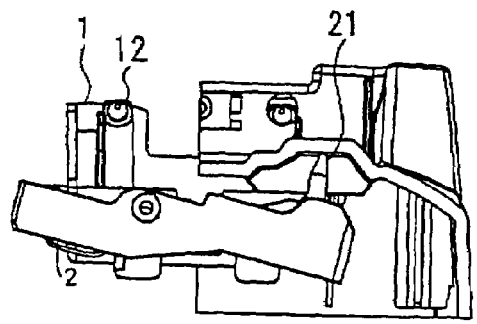
FIG. 6 is a section from another side of the charging communication-adaptor.
Figure 7:
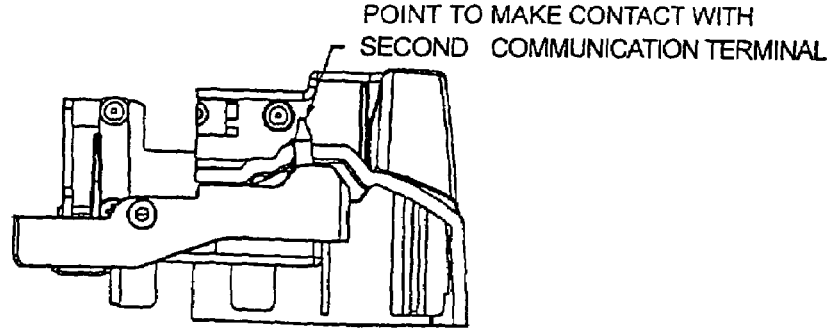
FIG. 7 is a section from another side of the charging communication-adaptor.

The transition of the status inside the charging communication-adaptor 3 is explained in sequential order with reference to FIGS. 4 to 7. FIG. 4 and FIG. 5 are sections from a side of the charging communication-adaptor 3. FIG. 6 and FIG. 7 are sections of the charging communication-adaptor 3 in the direction of an arrow F shown in FIG. 5. In FIG. 4, because the mobile device 4 is attached to the charging communication-adaptor 3, the mobile device 4 presses down the C part 11 and the holder 1 starts to rotate to protrude the first charging terminals 12. In FIG. 5, because the holder 1 rotates more, the D part 13 reaches the E part 23 by eliminating the clearance, and the first charging terminals 12 protrude and make a contact with the second charging terminals. In FIG. 6, because the D part 13 presses down the E part 23, the first communication terminals 21 start to protrude. In FIG. 7, because the holder 2 rotates more, the first communication terminals 21 protrude and make a contact with the second communication terminals. Finally, the charging communication-adaptor 3 is ready to establish communication between the mobile station 4 and the external device.

In this manner, the mobile device 4 starts charging before starting the communication when the mobile device 4 is attached to the charging communication-adaptor 3. Consequently, a stable voltage is applied to the charging communication-adaptor 3 and the mobile device 4 from an external device, so that stable communication is established between the mobile device 4 and the external device.

Embodiments that relate to the present invention are not limited to the embodiment where a mechanical clearance is prepared to make a time gap. The time gap is the time after the first charging terminals 12 make a contact with the second charging terminals till the first communication terminals 21 make a contact with the second communication terminals. Other mechanisms such as a time-delay mechanism may be prepared.

Figure 8:
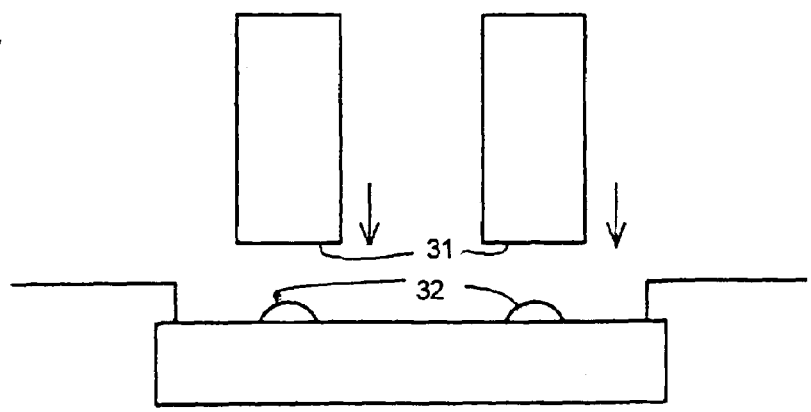
FIG. 8 is a view to explain shapes of terminals of the charging communication-adaptor and a mobile device.

It is preferable that the shapes of the ends of the terminals of the charging communication-adaptor 3 and the mobile device 4 are as those shown in FIG. 8. In other words, if ends 31 of the second charging terminals are flat, ends 32 of the first charging terminals 12 are made convex. On the other hand, if ends 31 of the second charging terminals are round, ends 32 of the first charging terminals 12 are made flat. Same is the case with the second communication terminals and the first communication terminals 21. Thus, there could be following four cases:

1) the first charging terminals 12 with convex-shaped ends make a contact with the second charging terminals with flat-shaped ends,
2) the first charging terminals 12 with flat-shaped ends make a contact with the second charging terminals with convex-shaped ends,
3) the first communication terminals 21 with convex-shaped ends make a contact with the second communication terminals with flat-shaped ends, and
4) the first communication terminals 21 with flat-shaped ends make a contact with the second communication terminals with convex-shaped end.

Figure 9:
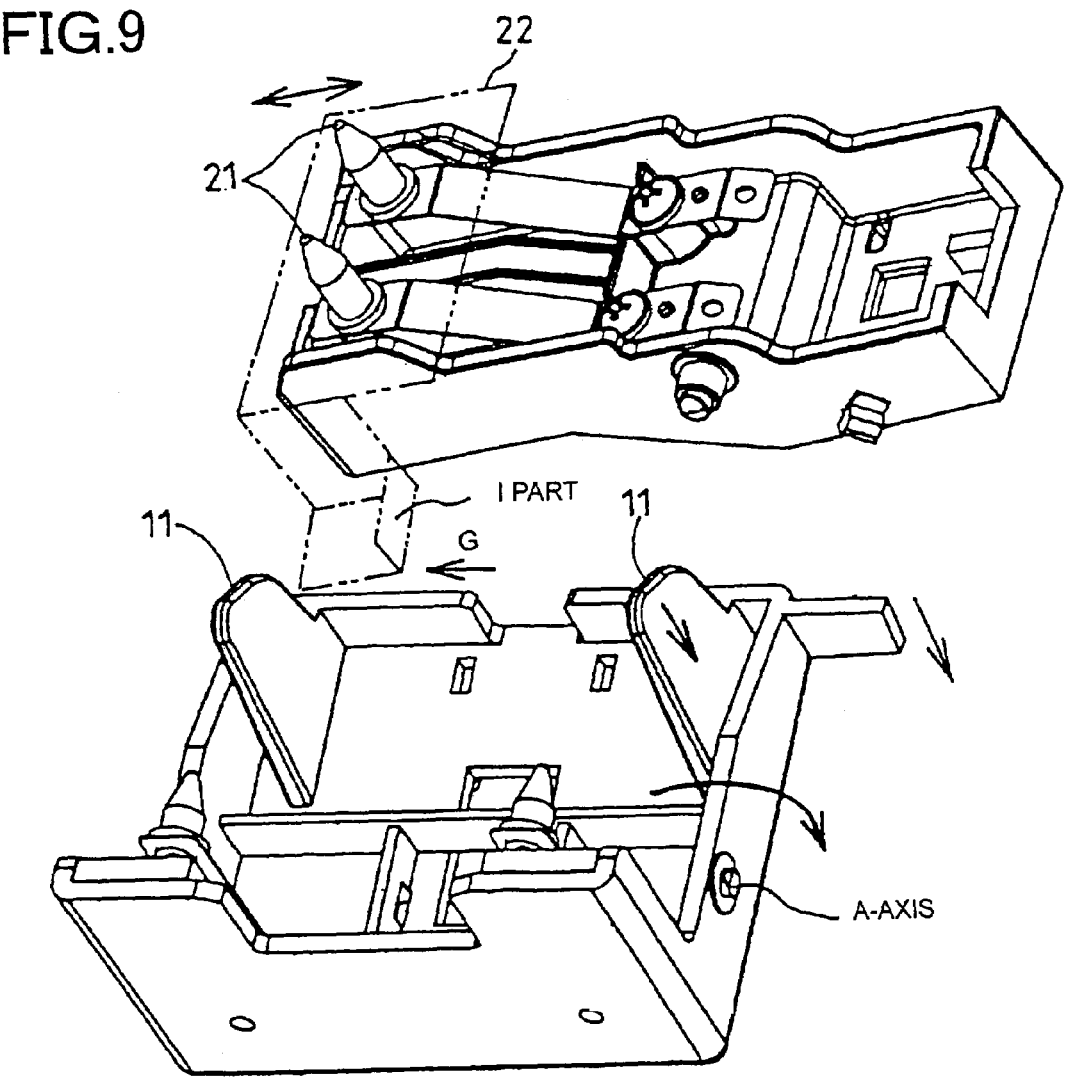
FIG. 9 is a view to explain a cover for the communication terminals.

A cover 22 may be provided to the charging communication-adaptor 3, as shown in FIG. 9, to cover the first communication terminals 21. When the mobile device 4 is attached to the charging communication-adaptor 3 and the C part is pressed down, an I part of the cover 22 slides to the direction of an arrow G. As a result, the cover 22 is removed and the first communication terminals 21 are exposed. The cover 22 has a function to clean dust or rust from the ends of both the first communication terminals 21 and the second communication terminals. Precisely, the cover 22 has cleaning components on the inner (with respect to the charging communication-adaptor 3) surface and on the outer surface. The cleaning components clean the ends of the terminals while the cover 22 slides to the direction of the arrow G. The cover 22 may be configured to rotate outward instead of sliding.

Figure 10:
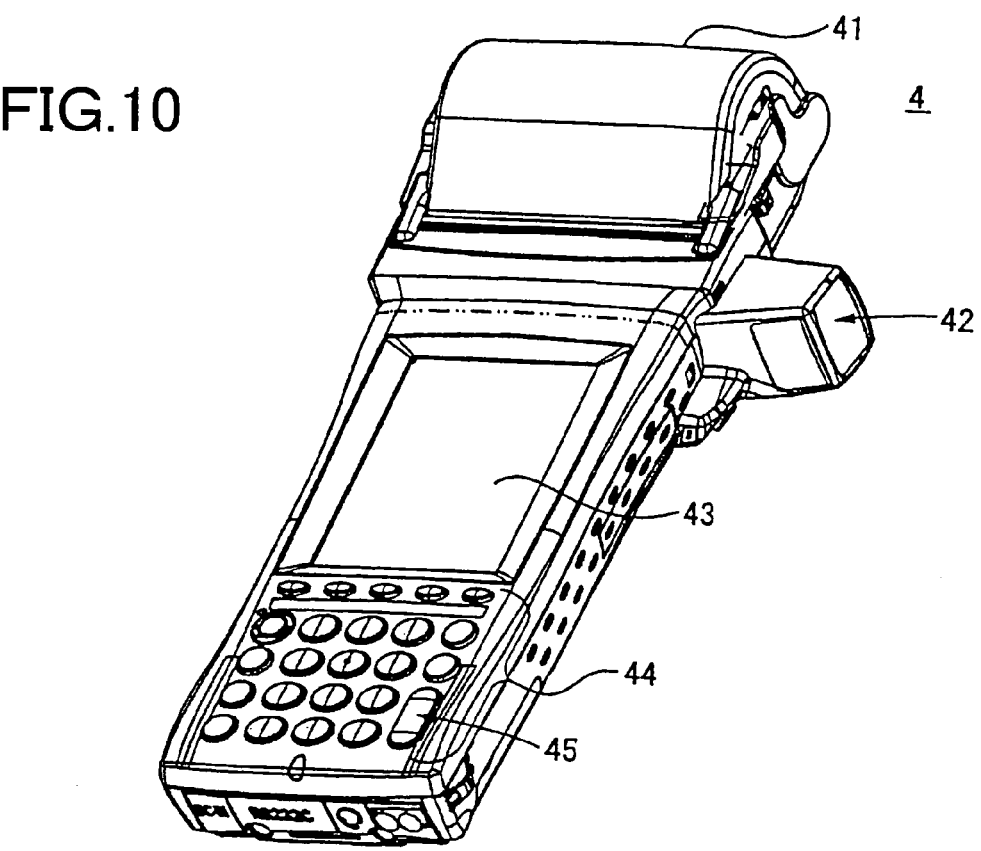
FIG. 10 is a perspective of a front side of the mobile device.
Figure 11:
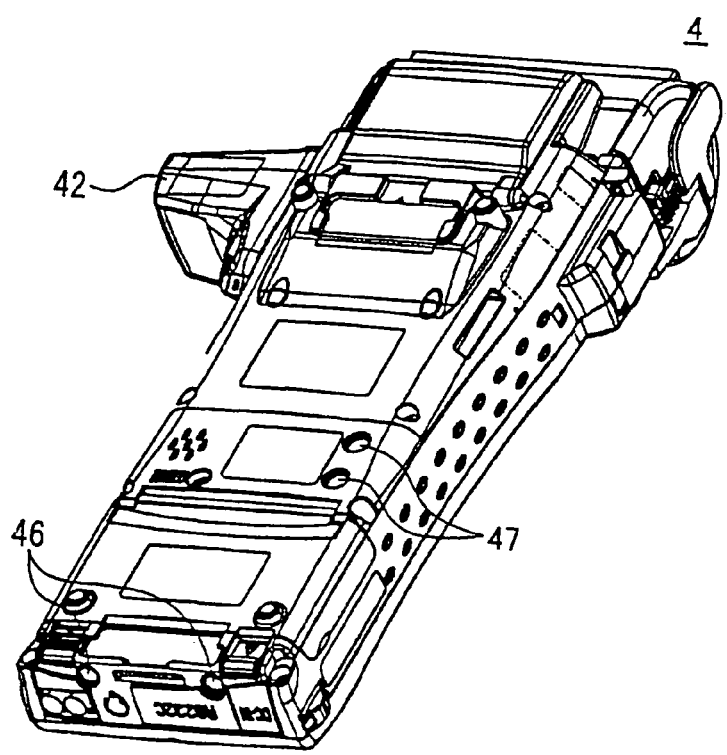
FIG. 11 is a perspective of a back side of the mobile device.

FIG. 10 is a perspective of a front side and FIG. 11 is a perspective of a back side of the mobile device 4. The mobile device 4 includes a printer (not shown) that prints data on a paper 41 such as a roll paper, a scanner 42 that reads images and bar-codes, a display 43 such as a liquid crystal display that displays data and images, a keyboard 44 for inputting data and commands. The keyboard 44 includes a communication button 45 described in FIG. 3. The mobile device 4 also includes two charging terminals 46, which are the second charging terminals, that make a contact with the first charging terminal 12, two communication terminals 47, which are the second communication terminals, that make a contact with the first communication terminals 21. The communication terminals 47 may be a USB terminal or an RS-232C terminal. When the USB terminal is applied to the charging communication-adaptor 3, the charging communication-adaptor 3 includes two USB terminals for the first charging terminals 12 and two USB terminals for the first communication terminals 21. The charging terminals 46 are used to only charge the mobile device 4. On the other hand, the communication terminals 47 are switched and used to communicate with and charge the mobile device 4, because the time during each communication is short enough.

Figure 12:
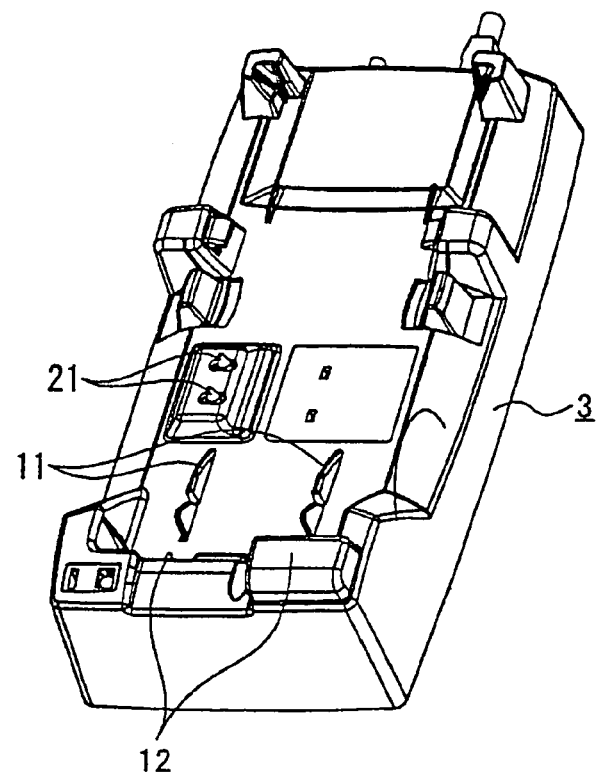
FIG. 12 is a perspective of the charging communication-adaptor when the mobile device is not attached.
Figure 13:
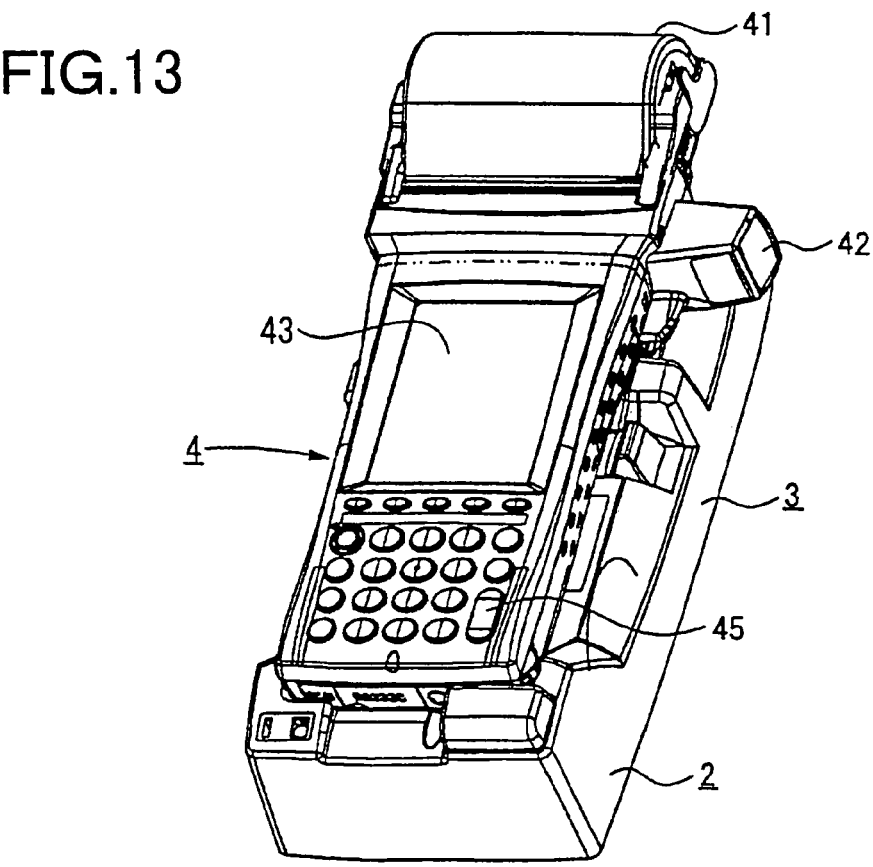
FIG. 13 is a perspective of the charging communication-adaptor when the mobile device is attached.
Figure 14:
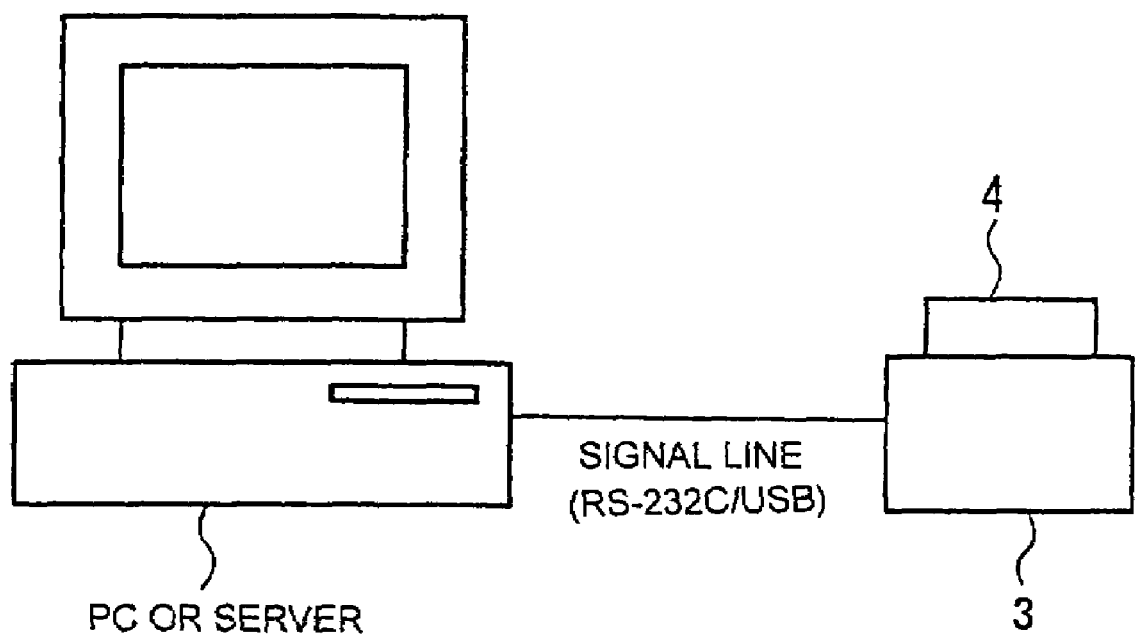
FIG. 14 is a view to explain how the charging communication-adaptor is connected to the external-device.

FIG. 12 is a perspective view of the charging communication-adaptor 3 when the mobile device 4 is not attached and FIG. 13 is a perspective view of the charging communication-adaptor 3 when the mobile device 4 is attached.

As a result of the configuration described above, when the mobile device 4 is attached to the charging communication-adaptor 3, the communication terminals of the mobile device and the charging communication-adaptor make a contact first, and then the charging terminals of the mobile device and the charging communication-adaptor make a contact. Therefore, it is possible to establish stable communication between the mobile device and the external device via the charging communication-adaptor.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A charging communication-adaptor for a mobile device, comprising:
a first arrangement that includes a first component, first charging terminals, and a protrusion, wherein
the first component is pressed down and rotates at a certain angle when the mobile device is attached to the charging communication-adaptor;
the first charging terminals protrude to make a contact with second charging terminals of the mobile device when the first component is pressed down and rotates; and
the protrusion moves in a certain direction when the first component is pressed down and rotates; and
a second arrangement that includes a second component and first communication terminals, wherein the second component is arranged at a certain distance, in the certain direction, from the protrusion, and
the second component makes a contact with the protrusion and the first charging terminals make a contact with the second charging terminals before the protrusion moves in the certain direction and starts to press down the second component, and
the first communication terminals protrude to make a contact with second communication terminals of the mobile device when the protrusion presses down the second component and the second arrangement rotates at a certain angle.

2. The charging communication-adaptor according to claim 1, wherein
if ends of the second charging terminals are flat, ends of the first charging terminals are convex,
if ends of the second charging terminals are convex, ends of the first charging terminals are flat,
if ends of the second communication terminals are flat, ends of the first communication terminals are convex,
if ends of the second communication terminals are convex, ends of the first communication terminals are flat.

3. The charging communication-adaptor according to claim 1, wherein a first axis rotates and protrudes the first charging terminals when the first component is pressed down, a second axis rotates and protrudes the first communication terminals when the second component is pressed down, and an angle between the first axis and the second axis is 0 degrees or 90 degrees.

4. The charging communication-adaptor according to claim 1, wherein the communication terminals are Universal Serial Bus (USB) terminals.

5. The charging communication-adaptor according to claim 1, wherein the first arrangement includes a cover that is removed to expose the first communication terminals.

6. The charging communication-adaptor according to claim 5, wherein the cover includes a cleaning component on an inner surface or an outer surface,
the cleaning component on the inner surface cleans tips of the first communication terminals when the cover is removed, and
the cleaning component on the outer surface of the cover cleans tips of the second communication terminals when the cover is removed.

7. A charging communication-adaptor for a mobile device, comprising:
first charging terminals;
first communication terminals; and
a cover that is removed to expose the first communication terminals, wherein
the first charging terminals are longer than the first communication terminals, and
when the mobile device is attached to the charging communication-adaptor, the first communication terminals make a contact with second communication terminals of the mobile device after the first charging terminals make a contact with second charging terminals of the mobile device.

8. The charging communication-adaptor according to claim 7, wherein the cover includes a cleaning component on an inner surface or an outer surface, the cleaning component on the inner surface cleans tips of the first communication terminals when the cover is removed, and the cleaning component on the outer surface of the cover cleans tips of the second communication terminals when the cover is removed.

* * * * *